(12) United States Patent
Kelly

(10) Patent No.: US 11,186,993 B2
(45) Date of Patent: *Nov. 30, 2021

(54) ENHANCED ROOFING COVER BOARD

(71) Applicant: Thomas L. Kelly, Waterbury, CT (US)

(72) Inventor: Thomas L. Kelly, Waterbury, CT (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/169,754

(22) Filed: Oct. 24, 2018

(65) Prior Publication Data

US 2019/0119918 A1 Apr. 25, 2019

Related U.S. Application Data

(60) Provisional application No. 62/576,477, filed on Oct. 24, 2017.

(51) Int. Cl.
*E04D 3/35* (2006.01)
*E04D 12/00* (2006.01)
*B32B 15/04* (2006.01)
*B32B 29/00* (2006.01)
*B32B 17/04* (2006.01)

(52) U.S. Cl.
CPC ............ *E04D 3/352* (2013.01); *E04D 12/00* (2013.01); *B32B 15/04* (2013.01); *B32B 17/04* (2013.01); *B32B 29/002* (2013.01); *B32B 2250/40* (2013.01); *B32B 2323/046* (2013.01); *B32B 2419/06* (2013.01)

(58) Field of Classification Search
CPC ..... B32B 15/04; B32B 2419/06; E04D 3/352; E04D 12/00
See application file for complete search history.

(56) References Cited

U.S. PATENT DOCUMENTS

| | | | | |
|---|---|---|---|---|
| 3,853,683 | A * | 12/1974 | Stapleford | D06N 5/00 442/391 |
| 3,867,494 | A * | 2/1975 | Rood | B29C 44/1209 264/45.3 |
| 4,438,166 | A * | 3/1984 | Gluck | B29C 44/12 428/113 |
| 4,670,071 | A * | 6/1987 | Cooper | E04D 5/12 156/247 |
| 4,726,973 | A * | 2/1988 | Thompson | E04C 2/246 428/316.6 |
| 5,374,474 | A * | 12/1994 | Pratt | B27N 3/007 428/220 |
| 6,391,456 | B1 * | 5/2002 | Krishnaswamy | B29C 70/086 156/172 |

(Continued)

FOREIGN PATENT DOCUMENTS

| | | | | |
|---|---|---|---|---|
| CA | | 2864703 A1 | 3/2015 | |
| WO | WO-2017194420 A1 * | | 11/2017 | ............ B27N 1/00 |

OTHER PUBLICATIONS

Letter received from Foley & Lardner LLP dated Dec. 17, 2019, 3 pages.

*Primary Examiner* — Christine T Cajilig
(74) *Attorney, Agent, or Firm* — Cantor Colburn LLP

(57) ABSTRACT

A cover board for use in a roofing system includes a core formed from recycled material. The core has a first major surface and a second major surface and the recycled material includes a plastic material. At least one region of the core has a concentration of plastic greater than a concentration of plastic within a remainder of the core.

20 Claims, 4 Drawing Sheets

(56) References Cited

U.S. PATENT DOCUMENTS

| | | | | |
|---|---|---|---|---|
| 7,351,462 | B2* | 4/2008 | Friedman | B32B 27/12 |
| | | | | 428/68 |
| 7,811,663 | B2* | 10/2010 | Paradis | E04C 2/296 |
| | | | | 428/315.9 |
| 8,707,643 | B1* | 4/2014 | Kalkanoglu | E04D 1/24 |
| | | | | 52/173.3 |
| 9,032,679 | B2 | 5/2015 | Propst | |
| 9,259,860 | B2* | 2/2016 | Kalkanoglu | B29B 17/00 |
| 2003/0056873 | A1* | 3/2003 | Nakos | B27N 1/00 |
| | | | | 156/94 |
| 2003/0165669 | A1* | 9/2003 | Nowak | B32B 21/02 |
| | | | | 428/212 |
| 2005/0005511 | A1* | 1/2005 | Sacks | A01G 9/28 |
| | | | | 47/33 |
| 2005/0008810 | A1* | 1/2005 | Semmens | B32B 3/14 |
| | | | | 428/53 |
| 2007/0066176 | A1* | 3/2007 | Wenstrup | B32B 5/022 |
| | | | | 442/415 |
| 2010/0037548 | A1* | 2/2010 | Kalkanoglu | B29C 48/49 |
| | | | | 52/309.1 |
| 2010/0126663 | A1* | 5/2010 | Kalkanoglu | C08L 95/00 |
| | | | | 156/289 |
| 2010/0304081 | A1* | 12/2010 | Dagher | B27N 3/04 |
| | | | | 428/114 |
| 2012/0214018 | A1* | 8/2012 | Mizrahi | B32B 15/08 |
| | | | | 428/600 |
| 2016/0031135 | A1* | 2/2016 | Hicks | B32B 37/025 |
| | | | | 264/279 |
| 2017/0260738 | A1* | 9/2017 | Harrison | B32B 7/08 |
| 2020/0122438 | A1* | 4/2020 | Stadler | B32B 21/02 |

* cited by examiner

ENHANCED ROOFING COVER BOARD

CROSS-REFERENCE TO RELATED APPLICATIONS

This application claims the benefit of U.S. Provisional Application No. 62/576,477, filed Oct. 24, 2017, which is incorporated herein by reference in its entirety.

BACKGROUND

Exemplary embodiments of the invention relate to a roofing system, and more particularly, to a cover board for use in a roofing system having a flat or low-slope roof.

Commercial and residential buildings having a flat or low-slope roof deck typically include a roofing system having at least one layer of insulation, a layer of roofing cover boards that overlie the one or more layers of insulation, and a waterproofing membrane that overlies the upper surface of the cover boards. The insulation is susceptible to damage, such as from the weather and other causes i.e. roof traffic and windblown debris commonly encountered in roofing construction. For example, snow loads, hail, vapor drive, condensation, and freeze and thaw cycles may cause membrane attachment to the insulation. The rigidity of the roofing cover board is intended to protect the more fragile insulation from damage. The waterproofing membrane overlying the cover board layer protects both the cover board and the insulation from moisture and other adverse climatic conditions. Normally, these three components are installed in succession to build the roofing system for a flat or low-slope roof deck. In addition, common cover boards, such as made from gypsum, fiberboard, and dense ISO insulation will absorb water in the event of a leak and deteriorate.

While these roofing systems function well, there remains a need to provide improved water resistant roofing cover boards.

BRIEF SUMMARY OF THE INVENTION

According to an embodiment, cover board for use in a roofing system includes a core formed from recycled material. The core has a first major surface and a second major surface and the recycled material includes a plastic material. At least one region of the core has a concentration of plastic greater than a concentration of plastic within a remainder of the core.

According to an embodiment, a method of forming a cover board includes shredding a composite material, and installing the shredded composite material within a fixture. The fixture includes one or more regions and a concentration of plastic within the shredded composite material of the one or more regions is greater than a concentration of plastic within the shredded composite material in a remainder of the fixture. The method additionally includes heating the shredded composite material and compressing the shredded composite material to form the cover board.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

The detailed description explains embodiments of the invention, together with advantages and features, by way of example with reference to the drawings.

DETAILED DESCRIPTION

Figure 1:
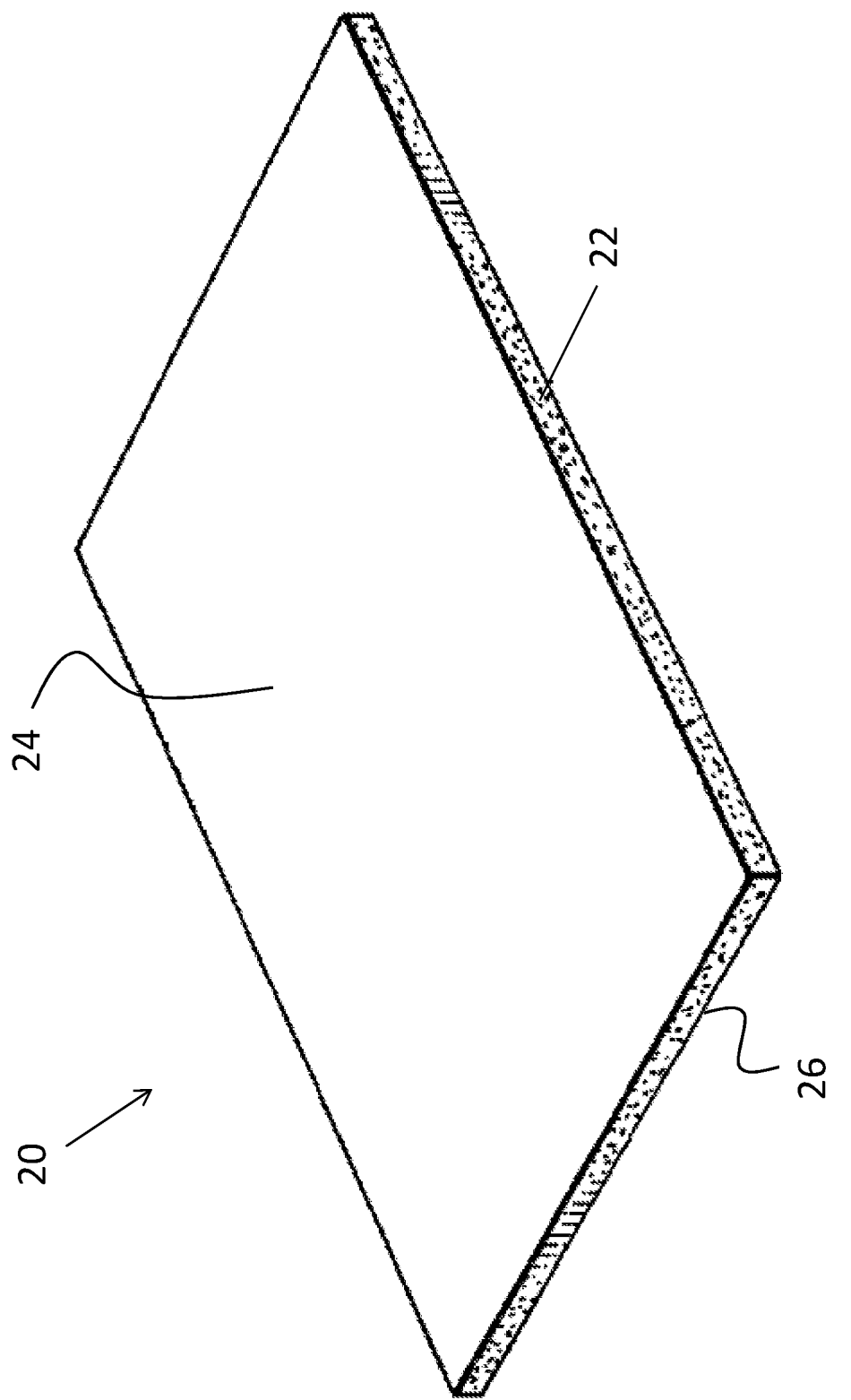
FIG. 1 is a perspective view of a cover board for use in a roofing application according to an embodiment.

Referring now to FIG. 1, a perspective view of an example of a cover board 20 configured for use in building applications is illustrated. The cover board 20 may be used in a variety of applications within a roofing system, such as for overlayment, underlayment, as a separator board, as a vapor barrier substrate, and as a recover board in reroofing applications. Although the cover board 20 is described with reference to a roofing system, it should be understood that the cover board 20 described herein may also be used in other building applications. For example, the cover board 20 may be configured to replace plywood applied to the exterior of a housing frame.

The weight of the cover board 20 is generally between about 1 pound per square foot and about 25 pounds per square foot, such as 2.5 pounds per square foot for example. The weight of the cover board 20 may vary in part based on the thickness of the cover board 20, and is selected based on the intended application of the cover board 20.

In the non-limiting embodiment illustrated in FIG. 1, the cover board 20 is generally rectangular in shape. However, it should be understood that a cover board 20 having any shape is within the scope of the disclosure. The cover board 20 includes a core 22 having a first major surface 24 and a second major surface 26 arranged on opposing sides thereof. The first major surface 24 and the second major surface 26 are defined as the surfaces of the cover board 20 having the greatest surface area. In the illustrated, non-limiting embodiment, the first and second major surfaces 24, 26 are defined by the length and width of the cover board 20.

The core 22 of the cover board 20 comprises a moisture and mold resistant composite material. In an embodiment, the composite material is formed entirely from recycled materials, such as beverage cartons, trash bags, and cups for example. In an embodiment, the recycled materials are shredded and then heated and compressed within a fixture (not shown) to form the core 22. As the recycled material is heated and compressed, the plastic contained therein melts and acts a binder for the non-meltable materials, such as cardboard for example. No additional binding material is required. Accordingly, the core 22 may be formed without the use of water, formaldehyde glues, or other hazardous chemicals. As a result, the cover board 20 is free from volatile organic compounds.

Figure 2:
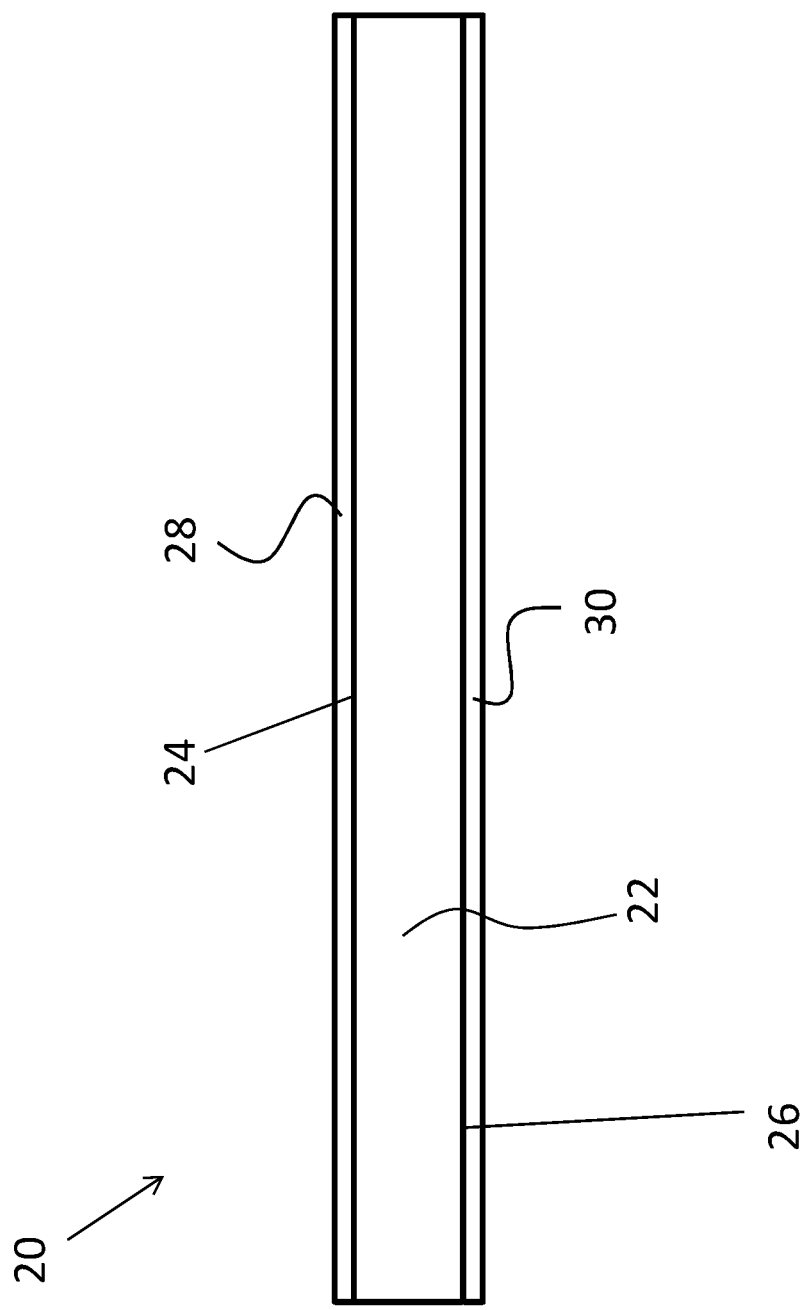
FIG. 2 is a cross-sectional view of a cover board including a facing layer according to an embodiment.

With reference now to FIG. 2, the cover board 20 may include a first facing layer 28 and/or a second facing layer 30 in an overlapping arrangement with the first and second major surfaces 24, 26, respectively. The facing layers 28, 30 may be configured to overlap the entirety, or only a portion, of a corresponding major surface 24, 26. The first and second facing layers 28, 30 may be any sheet material suitable for use with the cover board 20, such as paper or a woven material for example. In embodiments where the cover board 20 includes both a first facing layer 28 and a second facing layer 30, the first and second facing layers 28, 30 may, but need not be, formed from the same material or overlie the same portion of the cover board 20.

Conventional facing layers 28, 30 may be formed from a Kraft paper material. The Kraft paper may be any color, such as brown or white for example. However, in other embodiment, at least one of the first facing layer 28 and the second facing layer 30 may comprise another type of material. For example, in an embodiment, at least one of the facing layers 28, 30, may include a fiberglass coating containing one or more layers of a fiberglass material. The one or more layers of fiberglass material may overlie at least one of the major surfaces 24, 26 of the cover board 20. In such embodiments, the thickness of the facing layer 28, 30 including a fiberglass coating may be the same, or alternatively, may be different, for example greater, than if the facing layer 28, 30 is formed from another material, such as Kraft paper for example.

In another embodiment, at least one the first facing layer 28 and the second facing layer 30 may comprise a foil coating, such as formed from one or more layers of a foil material for example. The at least one layer of foil material may be located directly adjacent the core 22. The thickness of a facing layer 28, 30 including a foil coating may be the same, or alternatively, may be different, for example greater, than if the facing layer 28, 30 is formed from another material, such as Kraft paper, or fiberglass for example. The coating materials illustrated and described herein are intended as an example only. Further, it should also be understood that embodiments where the first facing layer 28 and/or the second facing layer 30 extend over additional surfaces of the cover board 20 besides the major surfaces 24, 26 are also within the scope of the disclosure.

The facing layers 28, 30 described herein, i.e. Kraft paper, fiberglass coating, and foil coating, are affixed to a corresponding major surface 24, 26 of the core 22 via any suitable means. In an embodiment, regardless of material, the facing layers 28, 30 are affixed to a surface of the core 22 without the use of a glue or mechanical fastener for example. In an embodiment, the facing layers 28, 30 are positioned between a heated surface of a press and the uncompressed recycled material of the core 22 during manufacturing. The facing layers 28, 30 function as carrier films that prevent the surface of the press from undesirably sticking to the core 22 after compression has occurred. As a result, during manufacturing, the melted plastic of the recycled material, specifically the low density polyethylene, acts as an adhesive to integrally form the facing layers 28, 30 with the exterior surfaces of the core 22.

Figure 3:
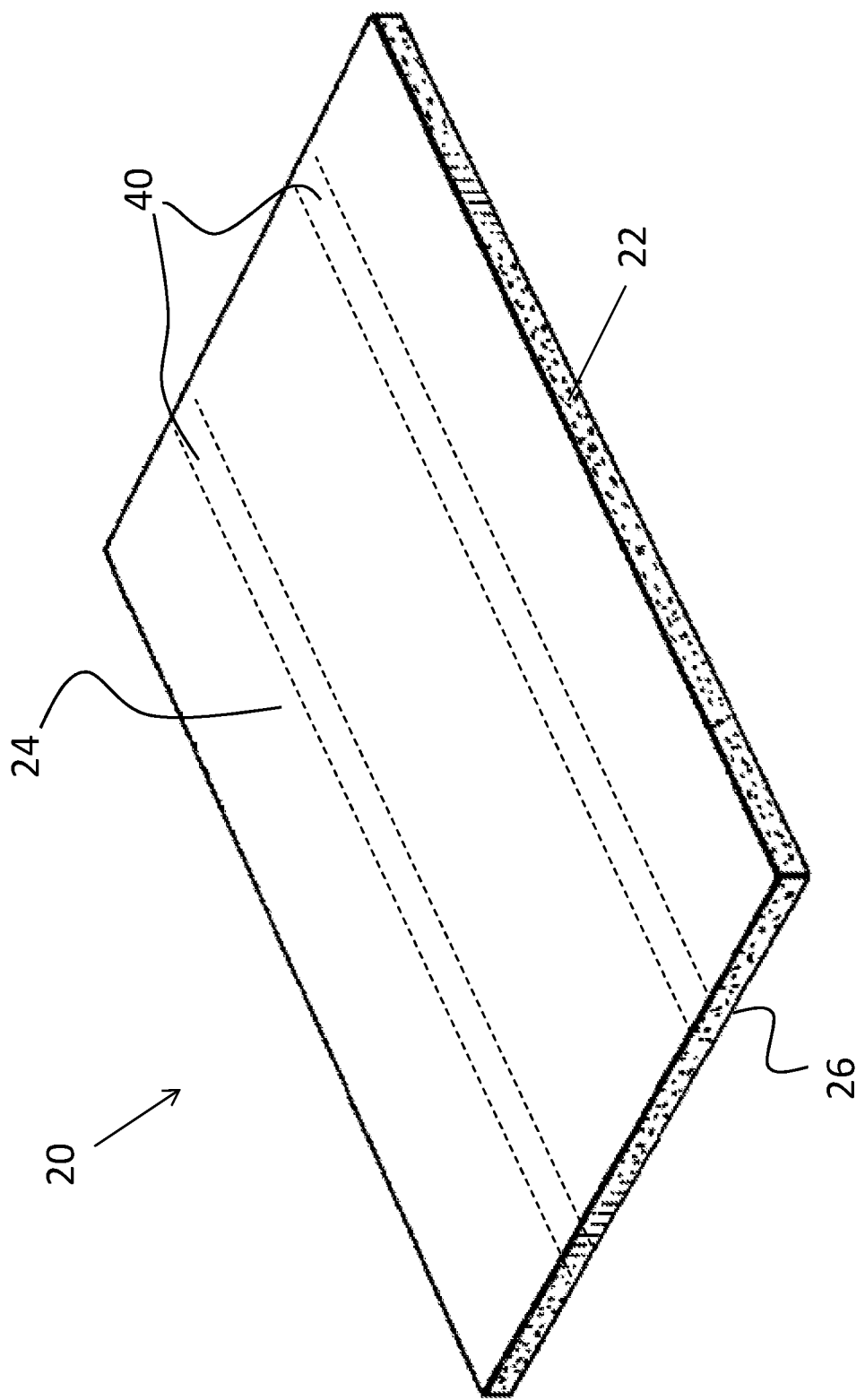
FIG. 3 is a perspective view of a cover board according to an embodiment.

With reference now to FIG. 3, one or more regions of the core 22 of the cover board 20 is configured to receive fasteners when the cover board 20 is installed in an application. These regions are illustrated schematically at 40 by broken lines. In an embodiment, these regions 40 may be located at 16" on center or 24" on center. However, a region 40 for receiving a fastener located at any position about the core 22 is contemplated herein, such as along one or more edges of the core 22 for example.

Figure 4:
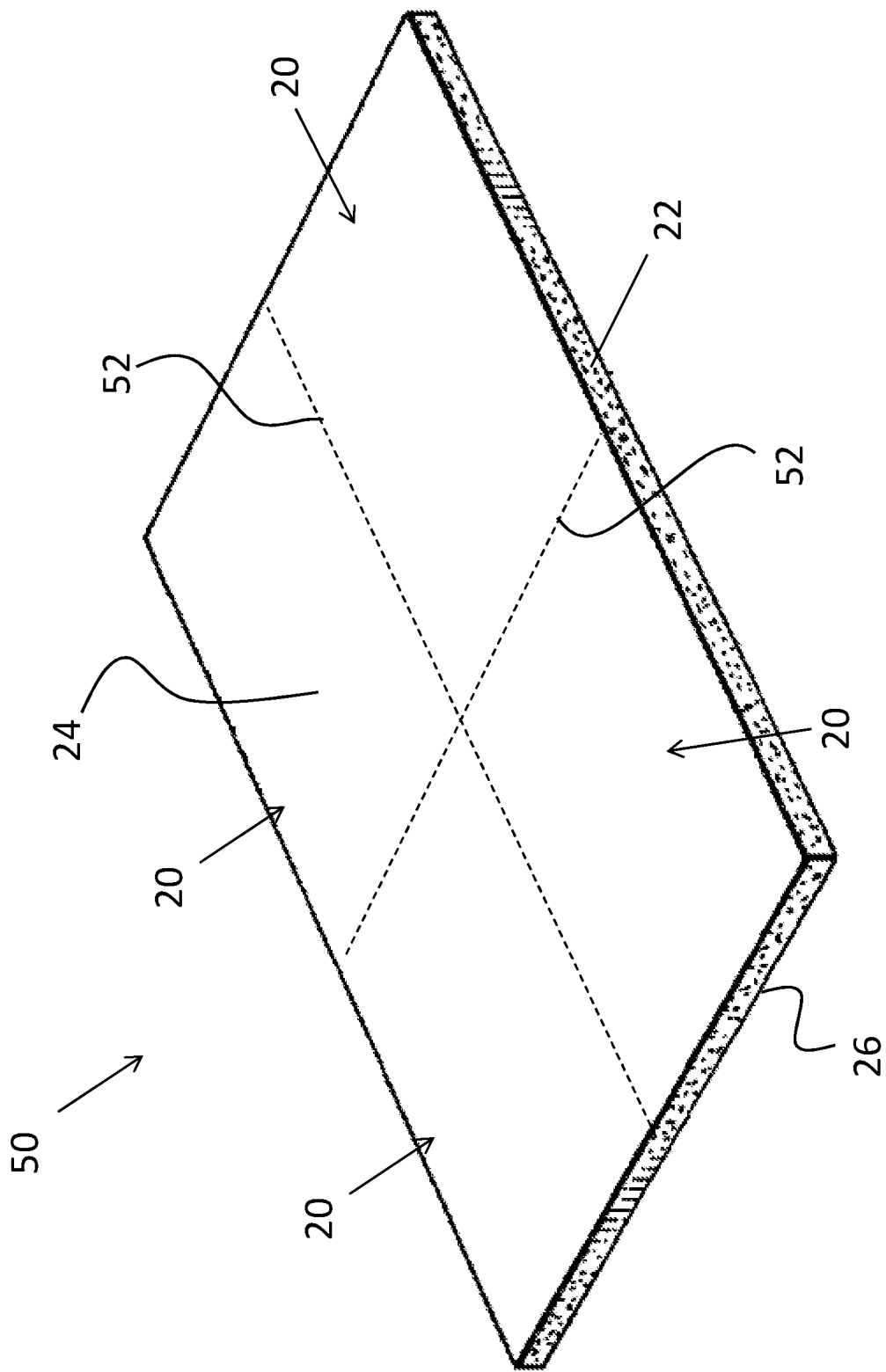
FIG. 4 is a cross-sectional view of a large cover board according to an embodiment.

In addition, in the non-limiting embodiment illustrated in FIG. 4, multiple cover boards 20 may be integrally formed as a single sheet during a manufacturing process. The large sheet, illustrated at 50, is then cut along one or more edges 52 to form the plurality of similar or different cover boards 20.

To provide additional strength and rigidity to the core 22, the core 22 may be formed such that a concentration of material, such as plastic for example, is greater within one or more desired areas of the core 22. The additional plastic may be added in the form of a low density polyethylene. In an embodiment, the areas of the core 22 having a greater concentration of material include the regions 40 of the core 22. Accordingly, the regions 40 of the core 22 have a first concentration of plastic and the remainder of the core 22 may have a second concentration of plastic, the concentration within the regions 40 being intentionally greater the concentration within the remainder of the core 22. In an embodiment, the concentration of plastic within the regions 40 is between 10% and 50% greater than within the remainder of the core 22. By increasing the material within the regions 40, the regions 40 have increased fastener resistance and enhanced sealing capabilities.

Alternatively, or in addition, the areas including a greater concentration of plastic may include the portions of the large cover board 50 generally adjacent the cuts 52 formed therein. For example, the areas having an increased concentration of low density polyethylene may extend one, two, or three or more inches in each direction from a cut line 52. Accordingly, a concentration of plastic adjacent the edges of the cut cover boards 20 is greater than the concentration of plastic within a central portion of the cut cover boards 20. In an embodiment, the concentration of plastic adjacent the cut lines 52 is between 10% and 50% greater than the concentration within a center of the cover board 20.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed is:

1. A cover board for use in a roofing system, comprising:
a core having a first major surface and a second major surface, the core having a first region and a second region, wherein both the first region and the second region are formed solely from recycled materials, wherein the recycled materials include a non-meltable cardboard material coated with a plastic material, wherein a concentration of plastic within the second region is greater than a concentration of plastic within the first region.

2. The cover board of claim 1, wherein a concentration of plastic within the second region is 10%-50% greater than the concentration of plastic within the first region.

3. The cover board of claim 1, wherein the plastic is a low-density polyethylene.

4. The cover board of claim 1, wherein the second region includes an area for receiving fasteners when the cover board is installed in the roofing system.

5. The cover board of claim 4, wherein the core additionally includes another second region, and a distance between the second region and the another second region is 24 inches on center.

6. The cover board of claim 4, wherein the core additionally includes another second region and a distance between the second region and the another second region is 16 inches on center.

7. The cover board of claim 1, wherein the first region includes an area adjacent an edge of the core.

8. The cover board of claim 1, further comprising a facing layer in overlapping arrangement with at least one of the first major surface and the second major surface.

9. The cover board of claim 8, wherein the facing layer is directly adjacent at least one of the first major surface and the second major surface.

10. The cover board of claim 8, wherein the facing layer includes a fiberglass material.

11. The cover board of claim 8, wherein the facing layer includes a paper.

12. The cover board of claim 8, wherein the facing layer includes a foil material.

13. The cover board of claim 1, wherein the recycled material is shredded and compressed.

14. The cover board of claim 1, wherein said weighted cover board has a weight between 1 pound/square foot and 2.5 pounds/square foot for a weighted cover board having a ½ inch thickness.

15. A method of forming a cover board comprising:
shredding a recycled material, the recycled material including a non-meltable cardboard coated with a plastic material;
installing the shredded recycled material within a fixture, wherein the fixture includes a first region and a second region and a concentration of plastic of the shredded composite material within the second region is greater than a concentration of plastic of the shredded recycled material in the first region;
heating the shredded recycled material; and
compressing the shredded recycled material to form a core of the cover board, the first region and the second region of the core being formed solely from the shredded recycled material.

16. The method of claim 15, wherein a concentration of plastic within the second region is at least 10% greater than the concentration of plastic within the first region.

17. The method of claim 15, wherein the plastic is a low density polyethylene.

18. The method of claim 15, wherein the second region includes an area for receiving fasteners.

19. The method of claim 15, further comprising cutting said shredded composite recycled material along at least one cut line to form a plurality of cover boards.

20. The method of claim 19, wherein the at least one cut line is formed through the first region.

\* \* \* \* \*